United States Patent
Lindsay

(10) Patent No.: US 11,175,095 B2
(45) Date of Patent: Nov. 16, 2021

(54) INSERT FOR WATERLESS PORTABLE PRECISION HEATING DEVICE

(71) Applicant: Ardent Life Inc., Boston, MA (US)

(72) Inventor: Shanel A. Lindsay, Roslindale, MA (US)

(73) Assignee: Ardent Life Inc., Boston, MA (US)

( * ) Notice: Subject to any disclaimer, the term of this patent is extended or adjusted under 35 U.S.C. 154(b) by 0 days.

(21) Appl. No.: 16/875,925

(22) Filed: May 15, 2020

(65) Prior Publication Data
US 2020/0278152 A1 Sep. 3, 2020

Related U.S. Application Data

(63) Continuation-in-part of application No. 16/833,415, filed on Mar. 27, 2020, now Pat. No. 10,871,327, which is a continuation-in-part of application No. 15/756,534, filed as application No. PCT/US2016/049974 on Sep. 1, 2016, now Pat. No. 10,710,038.

(60) Provisional application No. 62/213,968, filed on Sep. 3, 2015.

(51) Int. Cl.
*A47J 41/00* (2006.01)
*F27B 5/14* (2006.01)
*F27B 5/18* (2006.01)
*F27B 5/08* (2006.01)

(52) U.S. Cl.
CPC ............... *F27B 5/14* (2013.01); *F27B 5/08* (2013.01); *F27B 5/18* (2013.01)

(58) Field of Classification Search
CPC .......... A47J 41/00; A47J 41/0038–0044; A47J 41/0072–0077
USPC .................................. 219/385, 390
See application file for complete search history.

(56) References Cited

U.S. PATENT DOCUMENTS

| | | | |
|---|---|---|---|
| 4,279,824 | A | 7/1981 | McKinney |
| 4,463,664 | A | 8/1984 | Peace |
| 4,801,782 | A | 1/1989 | Ineson |
| 5,508,494 | A | 4/1996 | Sarris |
| 5,842,353 | A | 12/1998 | Kuo-Liang |
| 6,121,585 | A | 9/2000 | Dam |
| 6,369,364 | B1 | 4/2002 | Oe |
| 8,076,615 | B2 | 12/2011 | Morita |
| 8,596,189 | B2 | 12/2013 | Shoshan |
| 8,597,352 | B2 | 12/2013 | Schwartz |
| 8,847,123 | B2 | 7/2014 | Shoshan |

(Continued)

FOREIGN PATENT DOCUMENTS

| | | |
|---|---|---|
| EP | 3489169 A1 | 5/2019 |
| JP | 2004212029 A | 7/2004 |

(Continued)

OTHER PUBLICATIONS

I_Submit_This, "Cannabutter Recipe—95% Odorless Process", Jan. 19, 2012, Reddit, https://www.reddit.com/r/trees/comments/on7qp/cannabutter_recipe_95_odorless_process/.

(Continued)

*Primary Examiner* — Michael A Laflame, Jr.
(74) *Attorney, Agent, or Firm* — Mintz, Levin, Cohn, Ferris, Glovksy and Popeo, P.C.; Frank L. Gerratana

(57) ABSTRACT

An insert for a waterless portable heating device can include multiple containers or shelves arranged in layers for insertion into the device. For example, the insert can have multiple compartments to heat multiple separate ingredients at the same time, e.g., without the ingredients touching each other.

15 Claims, 12 Drawing Sheets

(56) References Cited

U.S. PATENT DOCUMENTS

| | | |
|---|---|---|
| 9,186,006 B2 | 11/2015 | Soule |
| 9,485,806 B1 | 11/2016 | Mcclendon |
| 9,743,797 B2 | 8/2017 | Richardson |
| 9,801,482 B1 | 10/2017 | Alexander |
| 10,710,038 B2 | 7/2020 | Lindsay |
| 2007/0142773 A1 | 6/2007 | Rosiello et al. |
| 2018/0243710 A1 | 2/2018 | Lindsay |
| 2020/0224973 A1 | 7/2020 | Lindsay |

FOREIGN PATENT DOCUMENTS

| | | |
|---|---|---|
| WO | WO2015/069763 | 5/2015 |
| WO | WO 2015069763 | 5/2015 |
| WO | WO 2017/040836 | 3/2017 |
| WO | WO 2017040836 | 3/2017 |

OTHER PUBLICATIONS

Unknown Author, "Table 4 HPLC Data from Decarboxylation of THCA Herbal Material," Aug. 19, 2014, Imgur, https:imgur.com/plrlmLx.

Glas-Col(R), "2006-2007 CE Product Catalog," Jan. 1, 2006, http://photos.labwrench.com/equipmentManuals/2839-1880.pdf.

Smuv, "Heating Mantle repair/construction," Mar. 21, 2011, The art and science of amateur experimentalism, http://www.sciencemadness.org/talk/viewthread.php?tid=15844.

International Search Report and Written Opinion received for PCT Application No. PCTUS2021032616, dated Aug. 26, 2021, 13 pages.

INSERT FOR WATERLESS PORTABLE PRECISION HEATING DEVICE

RELATED APPLICATIONS

This application is a continuation-in-part of U.S. patent application Ser. No. 16/833,415, filed on Mar. 27, 2020, which is a continuation-in-part application of U.S. patent application Ser. No. 15/756,534, filed on Feb. 28, 2018, which is a U.S. national stage application under 35 USC § 371 of International Application No. PCT/US2016/049974, filed on Sep. 1, 2016, which claims benefit of and priority to U.S. provisional applications 62/213,968, filed on Sep. 3, 2015, the entire contents of all applications which are incorporated herein by reference.

TECHNICAL FIELD

This description is related to precision cooking of food items and heating of crafting ingredients.

BACKGROUND

It can be difficult to heat foods and other ingredients evenly. Most kitchen appliances are heavy and bulky or use heating elements that don't allow for even heating, precise temperature control and portability. Devices that use water or steam as a heating source cannot exceed temperatures greater than 100° C. (and even lower than that in higher altitudes) without being pressurized.

SUMMARY

An insert for a waterless portable heating device can include multiple containers or shelves arranged in layers for insertion into the device. The details of one or more embodiments of the invention are set forth in the accompanying drawings and descriptions below. Other features, objects and advantages of the invention will be apparent from the description and drawings, and from the claims.

DESCRIPTION OF DRAWINGS

Like reference symbols in the various drawings indicate like elements.

DETAILED DESCRIPTION

The lightweight waterless portable precision heating device described herein uses even heating to warm and cook a variety of food-related, health-related, and crafting-related ingredients by using a thermal heating blanket and precision sensor to create an optimal heating environment. The waterless portable precision heating device does not rely on water or steam to heat the ingredients. Boiling water and steam reach a maximum temperature of 100° C. without pressure and are therefore too low for most heating applications, in addition to being impractical in many circumstances. Further, water boils at different temperatures depending on altitude, which leads to imprecision in the heating process and varying outcomes using that method. The waterless portable precision heating device also evenly distributes heat, avoiding hot spots and burned or under heated ingredients. Traditional cooking appliances use heating elements placed in configurations that do not allow for precise, even heat.

In order to solve these problems, iterations of the present device use include an ingredient container (sometimes called a product container) to contain a food-related, a health-related, or a crafting-related ingredient, the ingredient container being generally cylindrical with a flat bottom surface; a heating element configured to surround and contact the ingredient container; an insulation layer configured to surround and contact the heating element; an outer shell surrounding the insulation layer; a lid that encloses the product container and fluidly seals it from the environment; at least one sensor configured to detect the temperature of the heating sheet; and a circuit board with a microprocessor or microcontroller that controls the heating of the heating sheet in response to signals received from the at least one sensor indicating whether the product container has reached a threshold temperature. The device can maintain a temperature of over 100° C. without use of liquid or pressure. The resulting device allows for the even and precise heating of food-related, health-related, and crafting-related ingredients without the use of water as a conduit and the attendant temperature restrictions, or the inconsistency and weight of traditional kitchen appliances.

Figure 1:
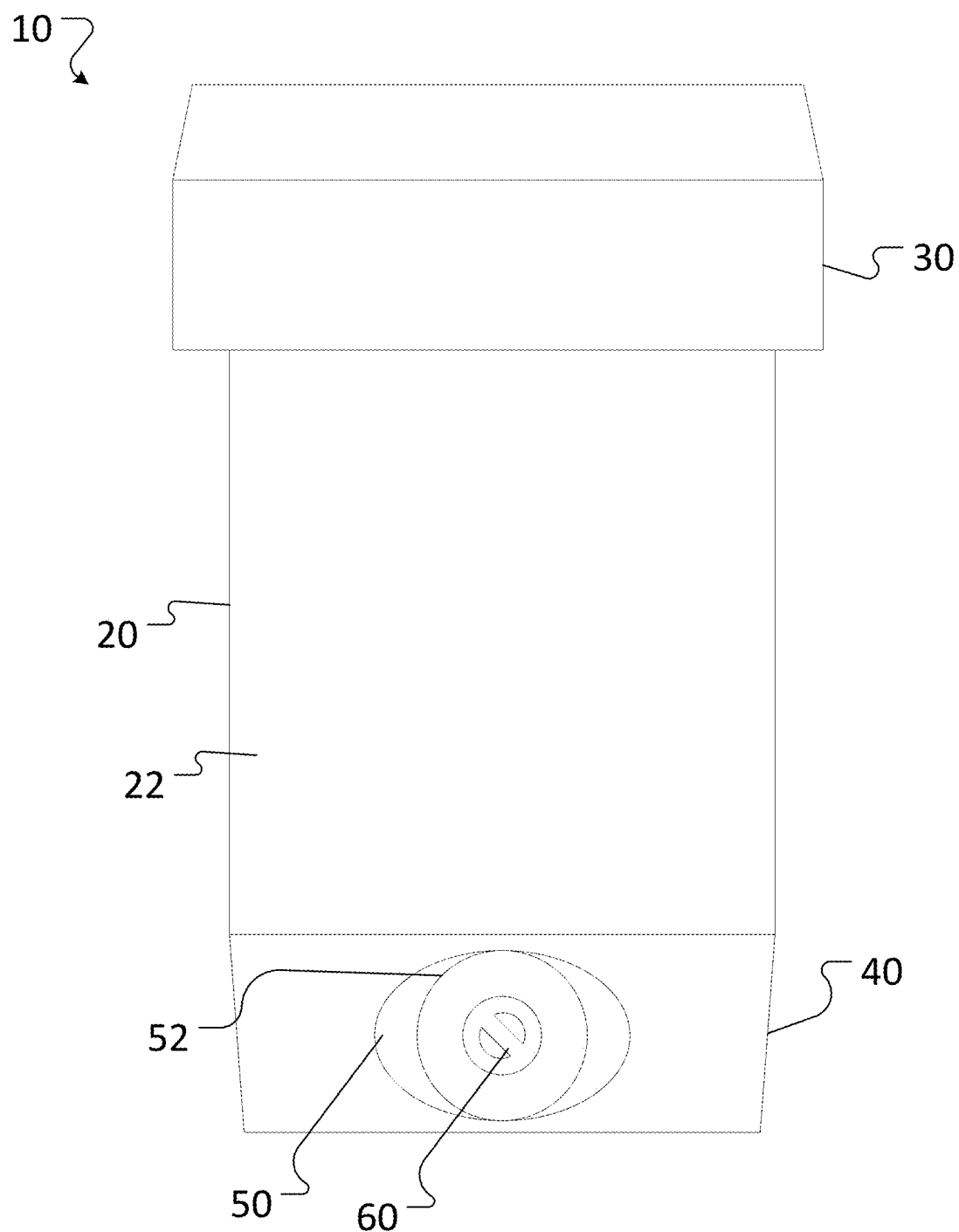
FIG. 1 is an external view of the lightweight waterless portable heating lightweight waterless portable heating device.

FIG. 1 shows an exterior view of the lightweight waterless portable heating device 10. The lightweight waterless portable heating device 10 includes a canister body 20 which fits with a lid 30. The canister body 20 is generally cylindrical, and includes a canister shell 22 which is hard and protects the inner contents of the canister body 20. The canister body 20 is joined with a canister base 40. During use, the canister base 40 sits on a flat surface such as a table or counter. The canister base 40 shown in FIG. 1 is tapered, however the canister base can be cylindrical as well. A user display interface 50 is also positioned on an exterior surface of the canister base 40. The user display interface 50 includes a button 52 that the user can press to begin the heating and cooling procedure of the lightweight waterless portable heating device 10. The user display interface also includes a light 60 that indicates the status of the lightweight waterless portable heating device 10 to the user. The light 60 can be turned on or off, and when on can show one or more colors, for example, red and green. The light 60 and the button 52 are shown as coincident or overlapping in FIG. 1, however the light 60 and button 52 may be combined into a single item, or alternatively may be located side by side.

Figure 2:
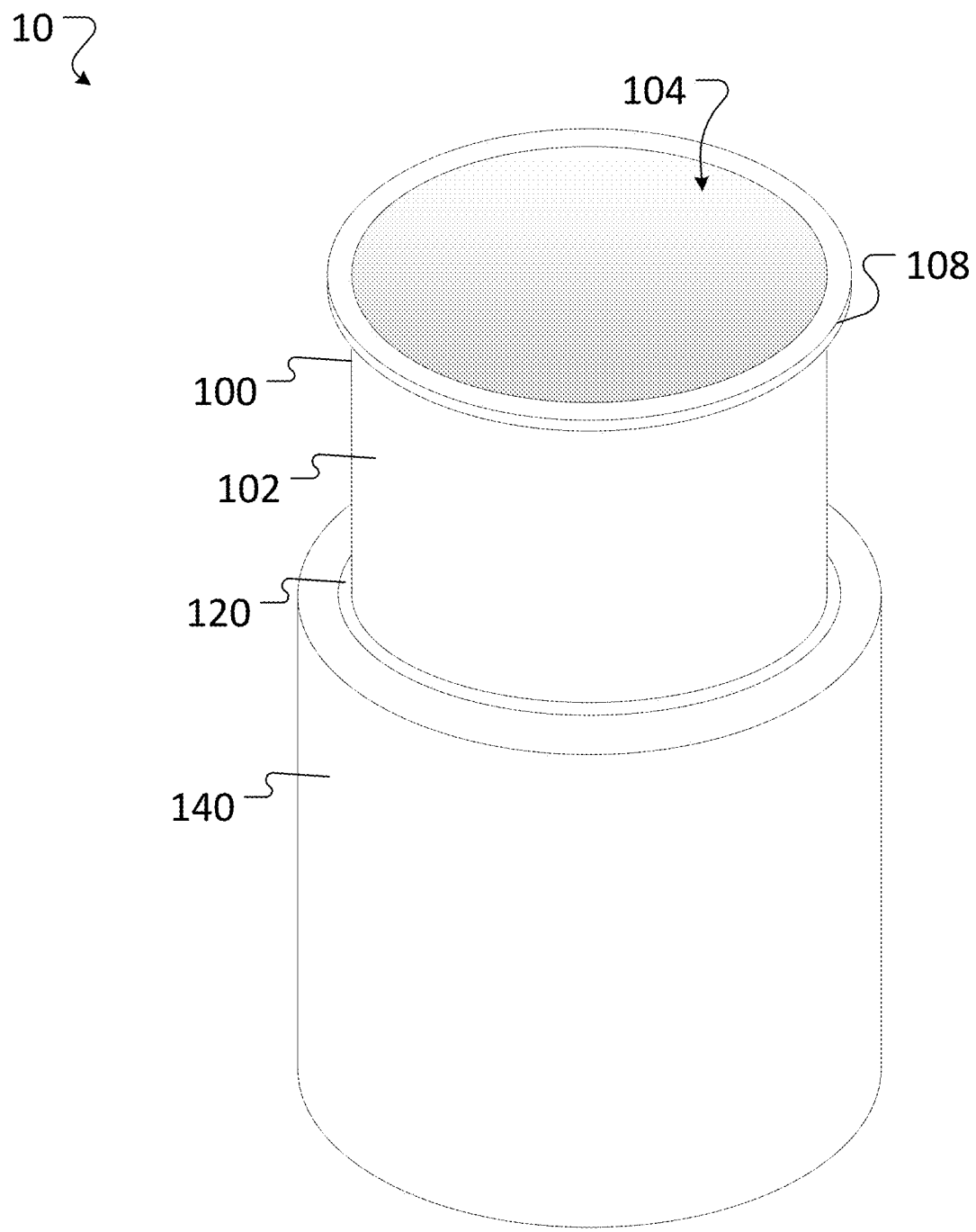
FIG. 2 is a perspective partially disassembled view showing portions of the inside of the lightweight waterless portable heating device with the inner canister raised.
Figure 3:
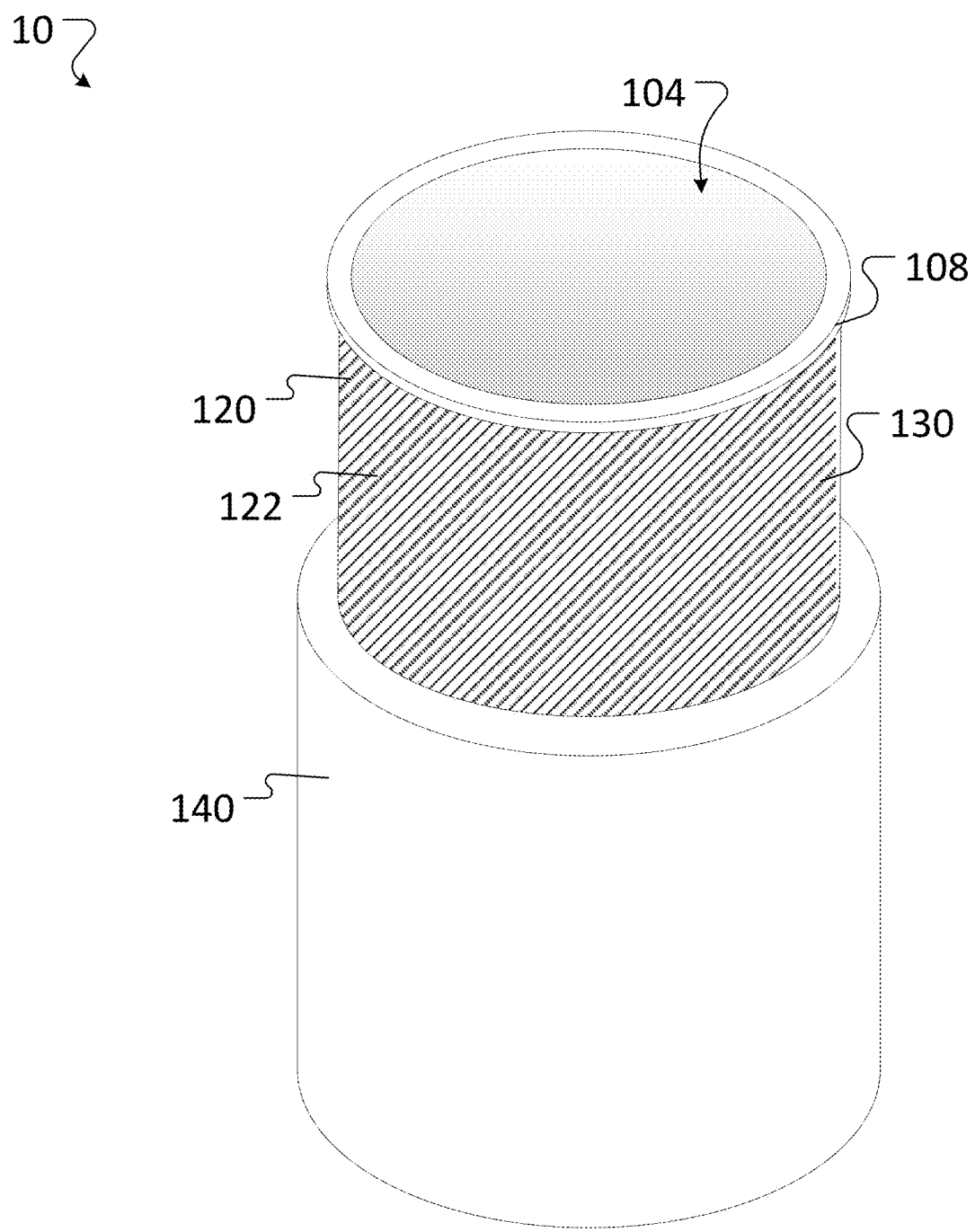
FIG. 3 is a perspective partially disassembled view showing portions of the inside of the lightweight waterless portable heating device with the heating cylinder raised.
Figure 4:
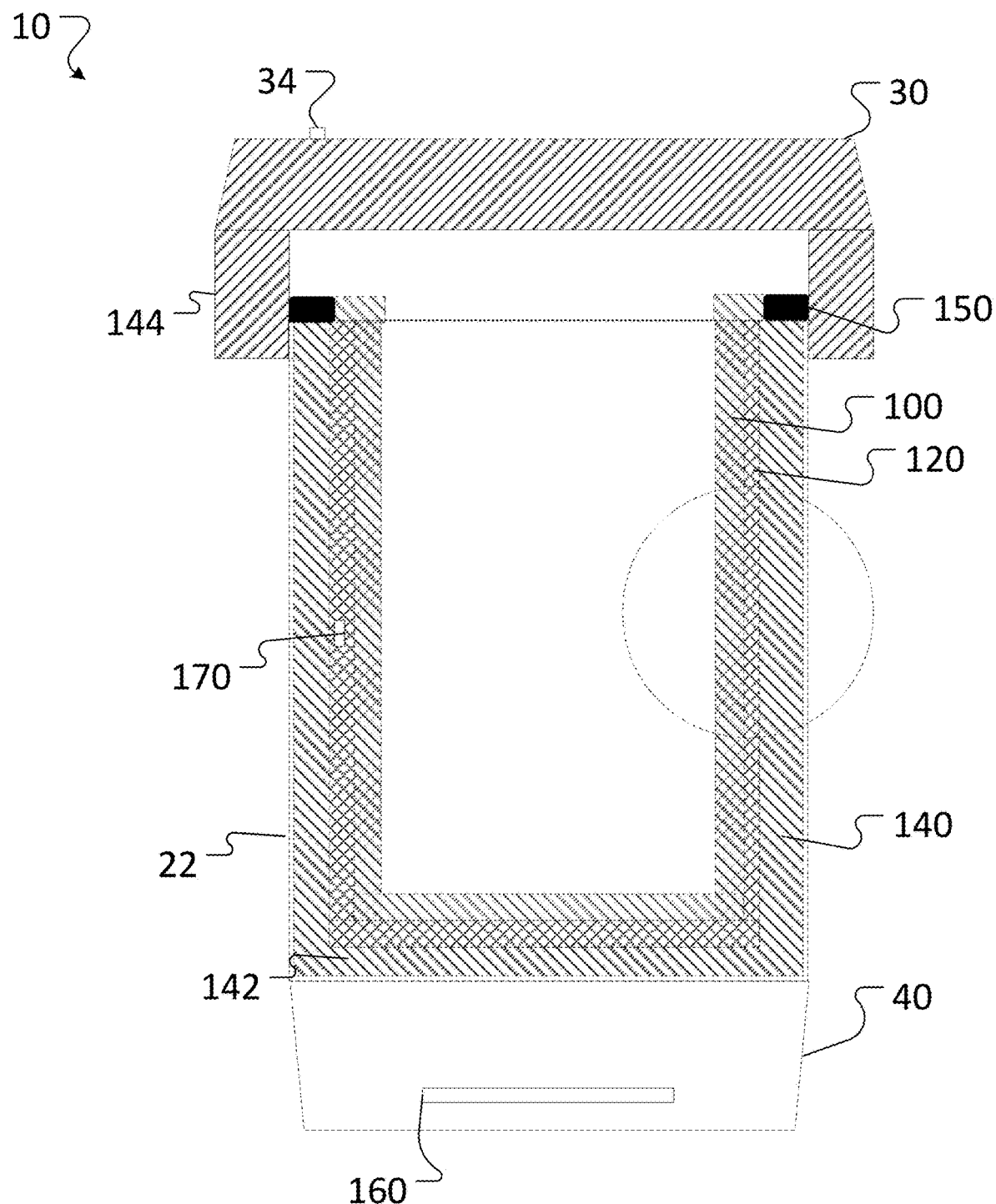
FIG. 4 is a cross section of an embodiment of the lightweight waterless portable heating device.

FIG. 2 shows the inside of canister body 20 with the canister shell 22 removed. Canister body 20 is shown to include a series of cylinders that fit one inside the other, and which all fit within the canister shell 22. The innermost cylinder is a receptacle or product container 100 that holds the food-related, health-related, or craft-related ingredient to be heated. This product container 100 can slide up and down, that is, vertically, and in FIG. 2 is shown in a raised position relative to the other components. The product container 100 is generally cylindrical with a smooth outer surface 102, and inner surface 104 which contacts the food-related, health-related, or craft-related ingredient. As best seen in FIG. 4, the product container 100 has a bottom portion that is flat and supports the food-related, health-related, or craft-related ingredient. The product container 100 also has a circumferential lip 108 at its upper surface so that the user can easily grasp the container and move it up and down. The product container 100 is slidable in and up/down direct for ease of use, allowing the user to raise the container or remove it from the rest of the canister body 20 in order to easily place the food-related, health-related, or craft-related ingredient inside of the product container 100. Once the food-related, health-related, or craft-related ingredient is placed inside the user then pushes the product container 100 back down inside the remainder of the canister body 20 so that it is nestled inside the other cylinders.

Referring to FIGS. 2-4B, the next layer circumferentially external to the product container 100 is the heating layer 120. Like the product container 100, the heating layer 120 is generally cylindrical with an outer surface 122 and an inner surface 124, and a flat bottom portion that connects the cylindrical walls. Once the product container 100 is in place, the product container 100 is surrounded by the heating layer 120.

Figure 4A:
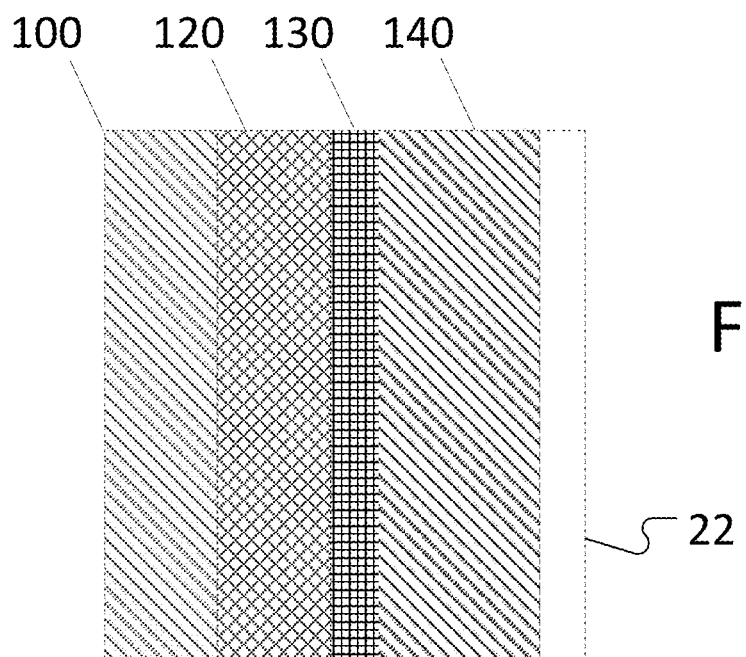
FIGS. 4A and 4B are enlargements of the area indicated in FIG. 4, showing two embodiments of the placement of the heater in the lightweight waterless portable heating device.
Figure 4B:
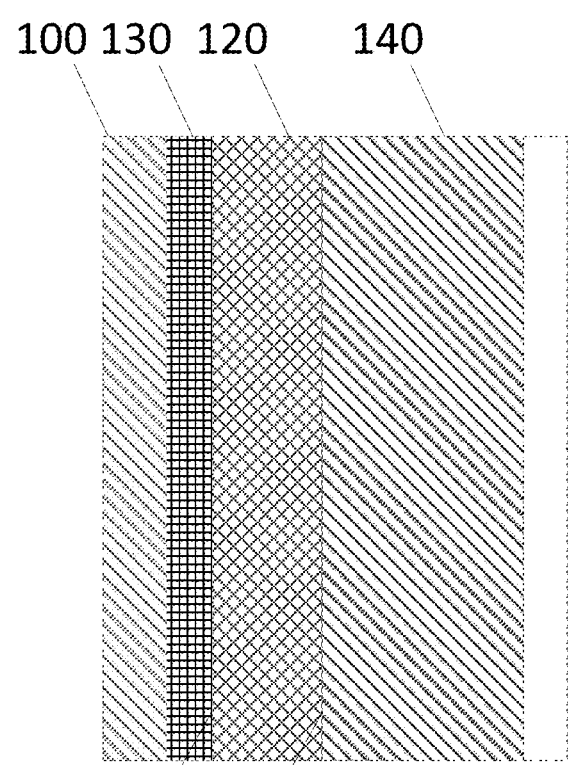

As shown in FIGS. 2 and 4A, the heating layer 120 has a flexible heating sheet 130 applied on the outer surface 122 of the heating layer 120. Alternatively, as shown in FIG. 4B, the heating sheet 130 can be located on the inner surface 124 of the heating layer 120. The heating sheet 130 is also known as a thermal blanket, and comprises a thin, flexible silicone wafer (e.g., less than 2 inches thick and 3 lbs weight) that can be wrapped around the heating layer 120. Such thermal blankets are known in the art, for example those produced by Birk Manufacturing. The heating sheet 130 is adhesive and can be adhered to the inner surface 124 or outer surface 122 of the heating layer 120. The heating sheet 130 can also be applied to the bottom portion of the heating layer 120.

When the heating sheet 130 is activated, the heat is transferred to the heating layer 120 and via conduction to the product container 100 and then via conduction and radiation to the food-related, health-related, or craft-related ingredient inside the product container 100.

Outside the heating layer 120 is a foam layer 140 to thermally isolate the product inside the lightweight waterless portable heating device 10 from the environment and its ambient heating conditions and to evenly distribute the heat. The foam layer 140 surrounds and contacts the heating layer 120 on the inner surface of the foam layer 140 (outer surface 122 of the heating layer 120) and the canister shell 22 on the outer surface of the foam layer 140 (inner surface of the canister shell 22), and maximizes the heat transfer from the heating element to the contents contained within the product container 100. As shown in FIG. 4, the foam protection can extend onto the bottom of the canister shell 22 with bottom protection foam layer 142. Foam may also extend around the surface of canister base 40. Foam layer 140 may can be composed of foam, or any other thermally isolating material suitable from preventing or reducing thermal transmission from the inside of the lightweight waterless portable heating device 10 to the environment.

Still referring to FIG. 4, on top of all the cylinders is a lid 30. The lid 30 can also have a foam layer 144 within the lid's outer shell to ensure even heating and to prevent heat loss from the product container 100 to the environment. The lid 30 can have a valve or steam hole 34 to allow heated air to escape the inside of the lightweight waterless portable heating device 10. The lid 30 is shown in snap-fittable engagement with the canister body 20 around the circumferential rim of canister body 20. Although the mechanism of releasably engaging lid 30 and canister body 20 is shown, alternate engagement mechanisms may be employed, such as regularly spaced projections radiating inwardly from the inner surface of lid 30 to mate with corresponding detents disposed in the outer upper surface of canister body 20, or a threaded connection between an inner surface of the lid 30 and an upper portion of the canister body 20. Other engagement mechanisms could be used.

Figure 5:
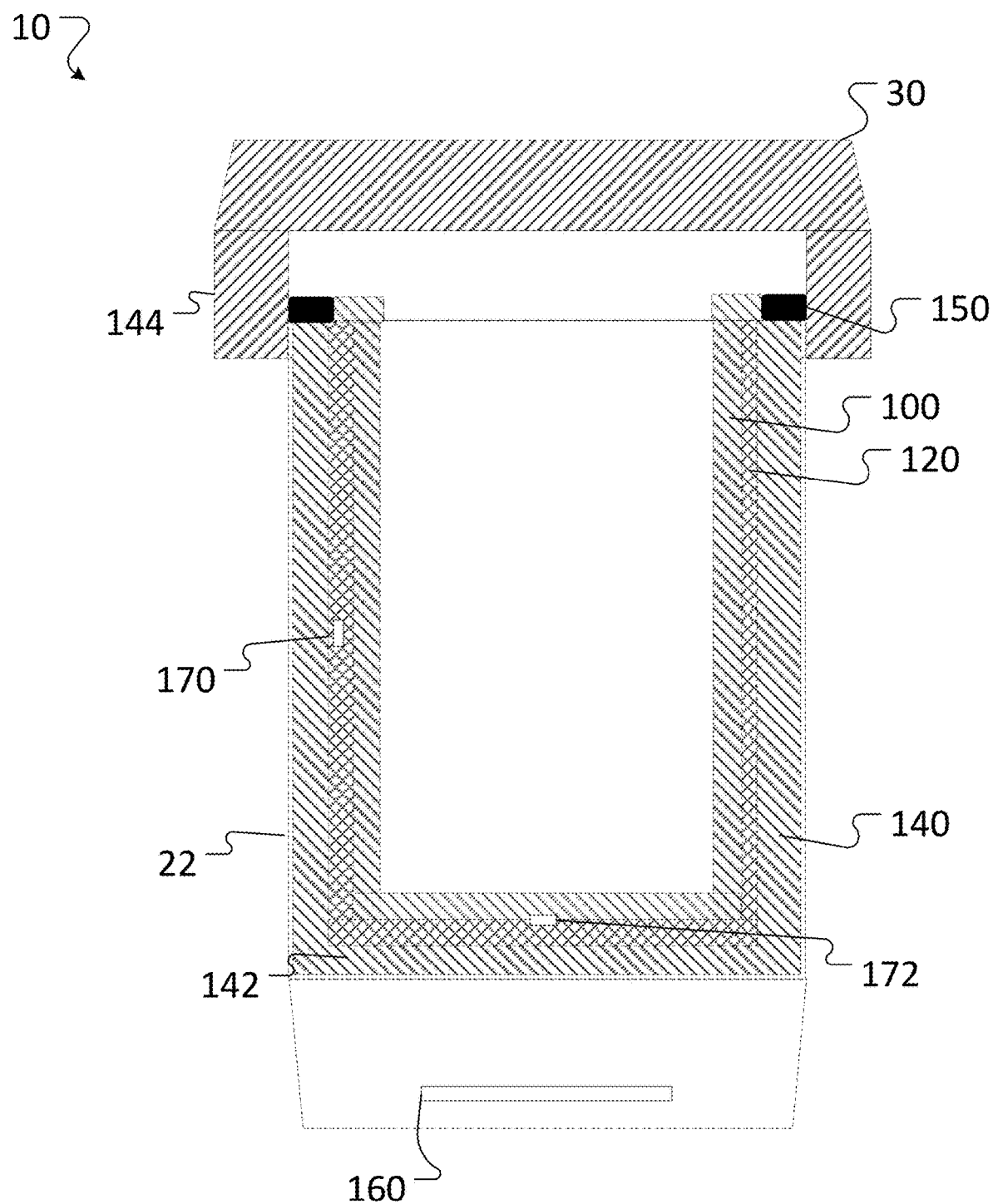
FIG. 5 is a cross section of a second embodiment of the lightweight waterless portable heating device.

The lid 30 is made to be airtight to prevent oxygen from entering the product container 100 during the heating process. For example, the lid 30 can be preferentially constructed out of silicone. Referring to FIGS. 4 and 5, the lightweight waterless portable heating device 10 can include an additional sealing element to reduce the amount of oxygen that leaks from the environment to the inside of the lightweight waterless portable heating device 10 by fluidly disconnecting the inside of the lightweight waterless portable heating device 10 from the environment. For example, seal 150 can be located between the lid 30 and the canister body 20. The seal 150 can be attached to an inner surface of the lid 30, the upper surface of the foam layer 140, or the top of the product container 100. The seal 150 can be O-ring.

The product container 100 and heating layer 120 can be constructed of a variety of suitable materials that efficiently conduct heat, such as various metals. The canister body 20 and lid 30 can be constructed of a variety of materials which are suitable, including, but not limited to, plastic, glass, silicone, food-grade butyl rubber, latex, aliphatic polyesters, natural rubber, metal, metal foils, polytetrafluoroethylene, biopolymers such as liquid wood, modified casein, polyhydroxyalkanoate polyesters, including polyhydroxybutrate, polyhydroxyvalerate, polylactic acid, starch based polyesters, keratin processed with methyl acrylate, hemp polymers, hemp plastic, hemp composite polymers, and combinations thereof. The canister body 20 is preferably constructed of a cylindrical shape, as shown in FIG. 1. The various cylindrical layers can be modified to taper inwardly as wall portions extend toward the canister base 40 so that an amount of the ingredients are to be evenly heated can aggregate together in the product container 100.

Referring again to FIGS. 4 and 5, the canister base 40 contains an empty space that houses a circuit board 160 with a microprocessor or microcontroller that controls the heating of the heating sheet 130. The canister base 40 that contains the circuit board 160 is located below and attached to the canister shell 22 with a screw or other fastening mechanism.

The circuit board 160 also monitors one or more sensors in the lightweight waterless portable heating device 10. For example, as shown in FIG. 4, there is at least one first sensor 170 located on the heating layer 120. The first sensor 170, for example a thermocouple, detects the temperature of the heating layer 120 and sends the signal to the circuit board 160. The first sensor 170 is preferably in contact with the heating sheet 130. Since the heating layer 120 is the hottest part of the lightweight waterless portable heating device 10, the first sensor 170 is reading the maximum temperature within the lightweight waterless portable heating device 10, and ensures that the temperature does not increase beyond a threshold temperature that may damage the contents contained within the product container, e.g., beyond 105 to 115 C.

FIG. 5 shows an embodiment in which there are at least two positions for sensors in the lightweight waterless portable heating device 10. In addition to the at least one sensor 170 on the heating layer 120 there is a second sensor 172 within the lightweight waterless portable heating device 10 located at a distance from the at least one sensor 170. This second sensor 172 can be located within the internal space in canister base 40. Alternatively, the second sensor 172 can be embedded within the heating layer 120, the foam layer 140, or on the bottom of the heating layer 120 either contacting the product container 100, or open to the space within the canister base 40. The second sensor 172 may include sensors in one or more of these locations.

With the at least two sensors 170, 172 detecting the temperature at different locations, the second sensor 172 ensures that the temperature everywhere inside the canister shell 22 or the lightweight waterless portable heating device reaches the desired temperature (e.g., less than 100° C., 100° C., greater than 100° C., 105° C., or any desired temperature depending on the ingredient to be heated). The first sensor 170 on the heating sheet 130 then works as a failsafe, measuring the hottest portion of the lightweight waterless portable heating device 10 so that the circuit board 160 ensures that the temperature is not above a threshold critical temperature (e.g., 105-115° C., or any temperature depending on the contents/ingredients that are to be heated).

Figure 6:
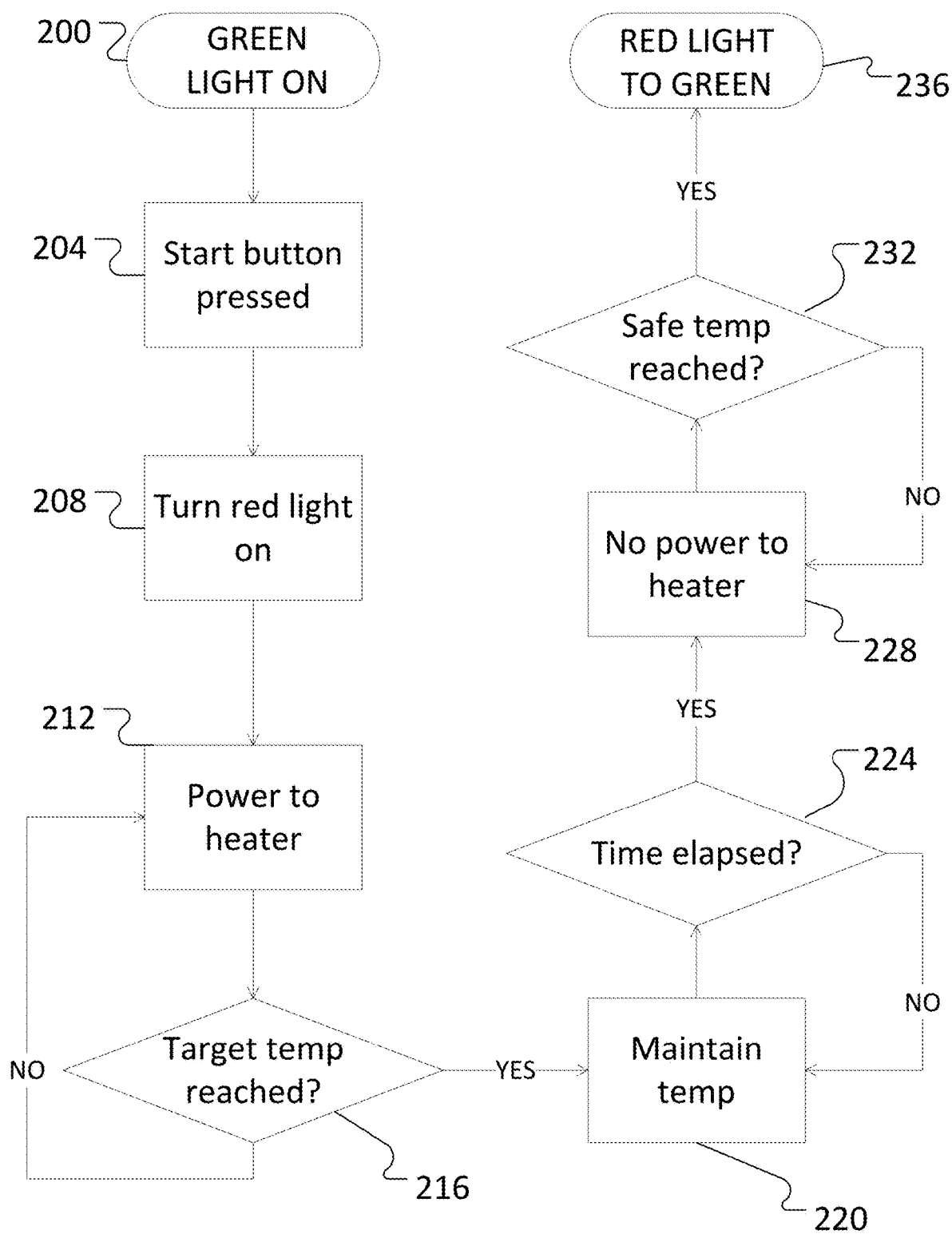
FIG. 6 is a flow chart of the heating algorithm of the device of FIG. 3.

FIG. 6 shows a flowchart describing the heating algorithm of the lightweight waterless portable heating device 10 with at least one first sensor 170 affixed to the heating sheet 130. The user first prepares the lightweight waterless portable heating device 10 for use by placing the food-related, health-related, or craft-related ingredient inside the product container 100, and lowering the product container 100 into its active position (e.g., the position shown in FIG. 4) and then attaching the lid 30 to the canister body 20.

With the lightweight waterless portable heating device 10 connected to a power source (e.g., plugged in) the lightweight waterless portable heating device 10 is now ready to begin its heating cycle. At the start 200 of the cycle, the light 60 on the user display interface 50 shows green, indicating that power is flowing to the lightweight waterless portable heating device 10 but that the heat cycle has not begun and is ready for use. The user presses the button 52 on the user display interface 50. The lightweight waterless portable heating device 10 detects that the button 52 was pressed (step 204), and turn the light 60 from green to red, indicating to the user that the cycle has begun (step 208). At step 212, power begins flowing to the heater in heating sheet 130.

At step 216, the first sensor 170 detects the temperature. If the target temperature (e.g., the desired temperature or threshold maximum temperature) is not reached, then power continues to flow to the heating sheet 130, step 212. If the target temperature has been reached, the lightweight waterless portable heating device 10 then maintains the temperature by reducing or stopping power to the heating sheet 130 (step 220). When the first sensor 170 registers the target temperature, the lightweight waterless portable heating device 10 notes the time, and then continually checks if the desired heating time has elapsed (step 224). If not, the device returns to step 220 of maintaining the temperature until the elapsed time at the desired heat is reached (e.g., 105° C. for 60 minutes). When the elapsed time is detected, power is cut from the heater (step 228), and the first sensor 170 continues to monitor the internal temperature. If the temperature is above a safe level (step 232), the lightweight waterless portable heating device 10 continues to block incoming power until the system has cooled to the desired temperature, e.g., a safe temperature such as room temperature or near room temperature. At step 236 the light 60 which is showing red returns to green, indicating to the user that the cycle is complete.

Figure 7:
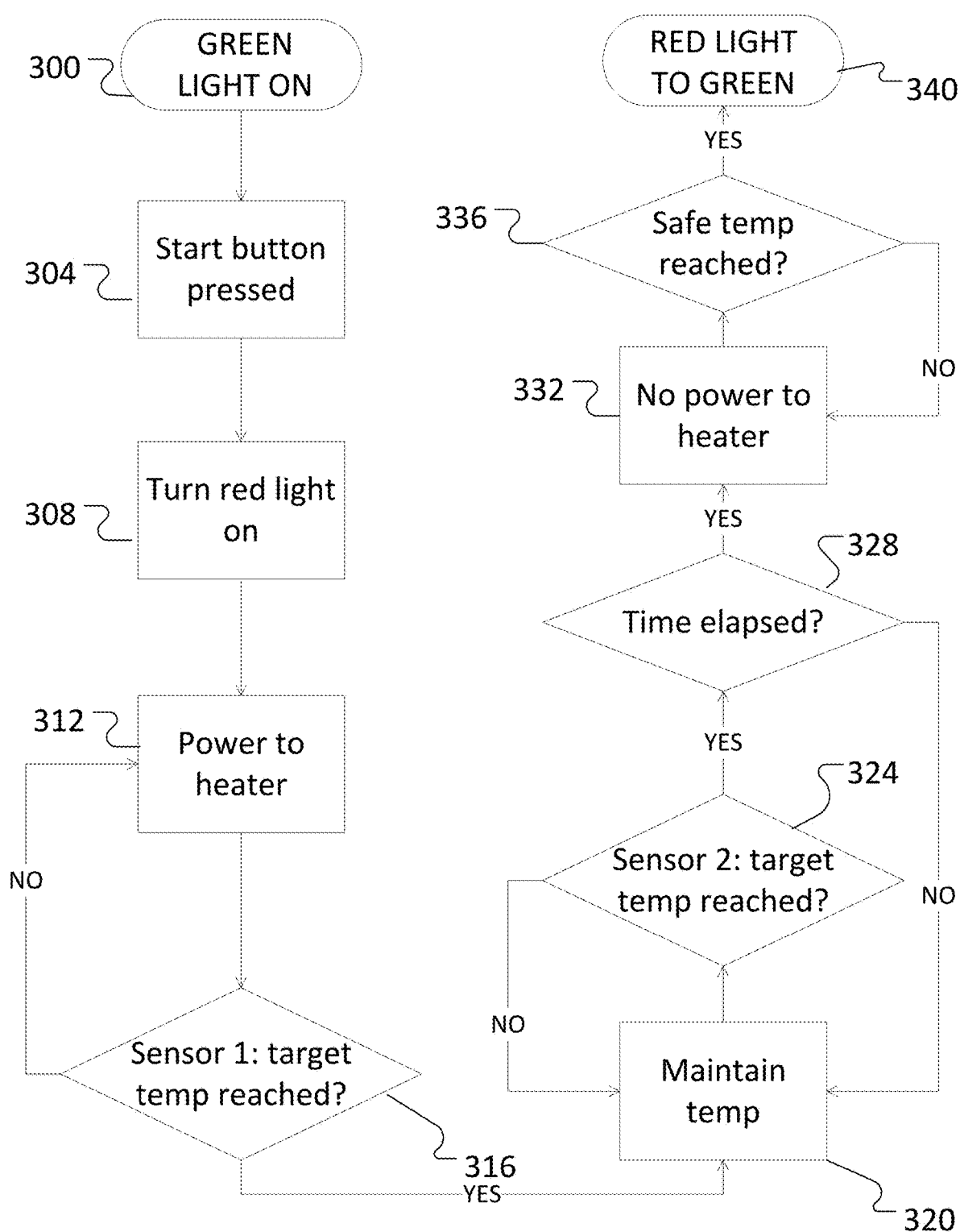
FIG. 7 is a flow chart of the heating algorithm of the device of FIG. 4.

FIG. 7 shows a flowchart describing the heating algorithm of the lightweight waterless portable heating device 10 with at least one first sensor 170 affixed to the heating sheet 130 and at least one second sensor 172 affixed elsewhere inside the canister shell 22 or inside the canister base 40. As for the previous embodiment, the user first prepares the lightweight waterless portable heating device 10 for use by placing the food-related, health-related, or craft-related ingredient inside the product container 100, and lowering the product container 100 into its active position (e.g., the position shown in FIG. 5) and then attaching the lid 30 to the canister body 20.

With the lightweight waterless portable heating device 10 connected to a power source (e.g., plugged in) the lightweight waterless portable heating device 10 is now ready to begin its heating cycle. At the start 300 of the cycle, the light 60 on the user display interface 50 shows green, indicating that power is flowing to the lightweight waterless portable heating device 10 but that the heat cycle has not begun and is ready for use. The user presses the button 52 on the user display interface 50. The lightweight waterless portable heating device 10 detects that the button 52 was pressed (step 304), and turn the light 60 from green to red, indicating to the user that the cycle has begun (step 308). At step 312, power begins flowing to the heater in heating sheet 130.

At step 316, the first sensor 170 detects the temperature. If the target temperature (e.g., the desired temperature or threshold maximum temperature) is not reached, then power continues to flow to the heating sheet 130, step 312. If the target temperature has been reached, the lightweight waterless portable heating device 10 then maintains the temperature by reducing (or stopping) power to the heating sheet 130 (step 320).

At step 324, the second sensor 172 detects the temperature at its second location. If the target temperature (e.g., the desired temperature or threshold maximum temperature) is not reached at the second location, then power continues to flow to the heating sheet 130 to maintain the temperature sensed by first sensor 170, step 320. The lightweight waterless portable heating device 10 continues at this power level, while heat continues to flow and heat up the location of second sensor 172, indicating that the whole interior of the lightweight waterless portable heating device 10 has reached the target temperature.

When the second sensor 172 registers the target temperature, the lightweight waterless portable heating device 10 notes the time, and then continually checks if the desired heating time has elapsed (step 328). If not, the device returns to step 320 of maintaining the temperature until the elapsed time at the desired heat is reached (e.g., 105° C. for 60 minutes). When the elapsed time is detected, power is cut from the heater (step 332), and the first sensor 170 and/or the second sensor 172 continues to monitor the internal temperature. If the temperature is above a safe level (step 336), the lightweight waterless portable heating device 10 continues to block incoming power until the system has cooled to the desired temperature, e.g., a safe temperature such as room temperature or near room temperature. At step 340 the light 60 which is showing red returns to green, indicating to the user that the cycle is complete.

Although a light is described in the examples described above, any other suitable user interface element could be used to communicate the same information to the user. As another example, the device 10 could have a communication interface for communicating with an external device (e.g., a Bluetooth interface), and could send a notification to the external device (e.g., a smartphone, smartwatch, or other suitable device) which could then display information related to the notification on its user interface.

Figure 8:
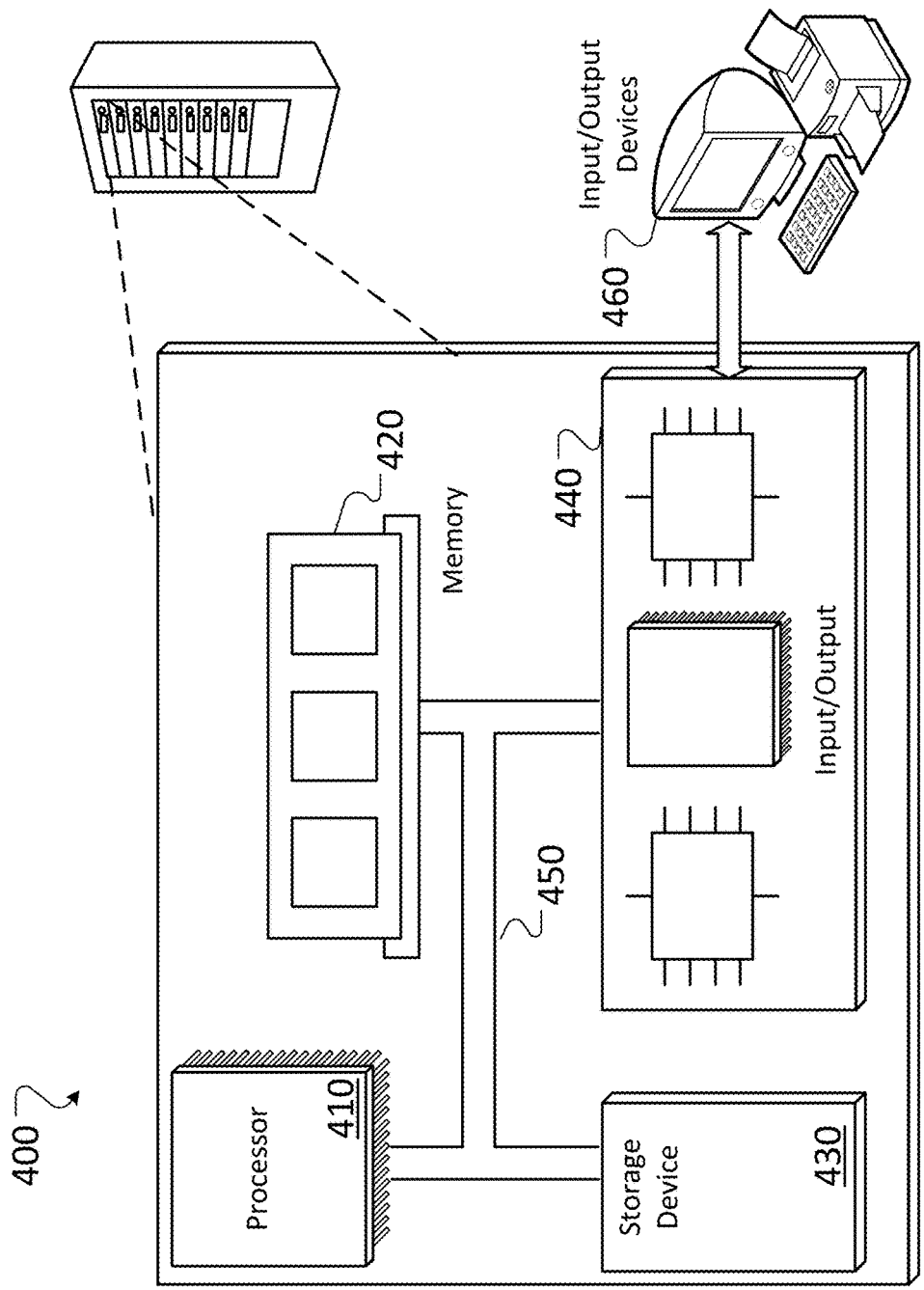
FIG. 8 is an example computer block diagram for controlling the lightweight waterless portable heating device.

FIG. 8 is a block diagram of an example computer system 400. For example, referring to FIG. 4 or 5, circuit board 160 could be a part of an example of the system 400 described here. The system 400 includes a processor 410, a memory 420, a storage device 430, and one or more input/output interface devices 440. Each of the components 410, 420, 430, and 440 can be interconnected, for example, using a system bus 450.

The processor 410 is capable of processing instructions for execution within the system 400. The term "execution" as used here refers to a technique in which program code causes a processor to carry out one or more processor instructions. The processor 410 is capable of processing instructions stored in the memory 420 or on the storage device 430. The processor 410 may execute operations such as lightweight waterless portable heating of a food-related, health-related, or craft-related ingredient.

The memory 420 stores information within the system 400. In some implementations, the memory 420 is a computer-readable medium. In some implementations, the memory 420 is a volatile memory unit. In some implementations, the memory 420 is a non-volatile memory unit.

The storage device 430 is capable of providing mass storage for the system 400. In some implementations, the storage device 430 is a non-transitory computer-readable medium. In various different implementations, the storage device 430 can include, for example, a hard disk device, an optical disk device, a solid-state drive, a flash drive, magnetic tape, or some other large capacity storage device. In some implementations, the storage device 430 may be a cloud storage device, e.g., a logical storage device including one or more physical storage devices distributed on a network and accessed using a network. In some examples, the storage device may store long-term data, such as the number of times the lightweight waterless portable heating device 10 has completed a cycle, the maximum and/or minimum temperatures recorded during each cycle, and/or the temperature profiles of each cycle. The input/output interface devices 440 provide input/output operations for the system 400. In some implementations, the input/output interface devices 440 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, etc. A network interface device allows the system 400 to communicate, for example, transmit and receive such data. In some implementations, the input/output device can include driver devices configured to receive input data and send output data to other input/output devices, e.g., keyboard, printer and display devices 460. In some implementations, mobile computing devices, mobile communication devices, and other devices can be used.

Referring to FIGS. 6 and 7, the described algorithms can be realized by instructions that upon execution cause one or more processing devices to carry out the processes and functions described above, for example, lightweight waterless portable heating of a food-related, health-related, or craft-related ingredient. Such instructions can include, for example, interpreted instructions such as script instructions, or executable code, or other instructions stored in a computer readable medium.

A server or database system can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 400 is contained within a single integrated circuit package. A system 400 of this kind, in which both a processor 410 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 440.

Although an example processing system has been described in FIG. 7, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, and displaying artifacts can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry. Sometimes a server is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Figure 9:
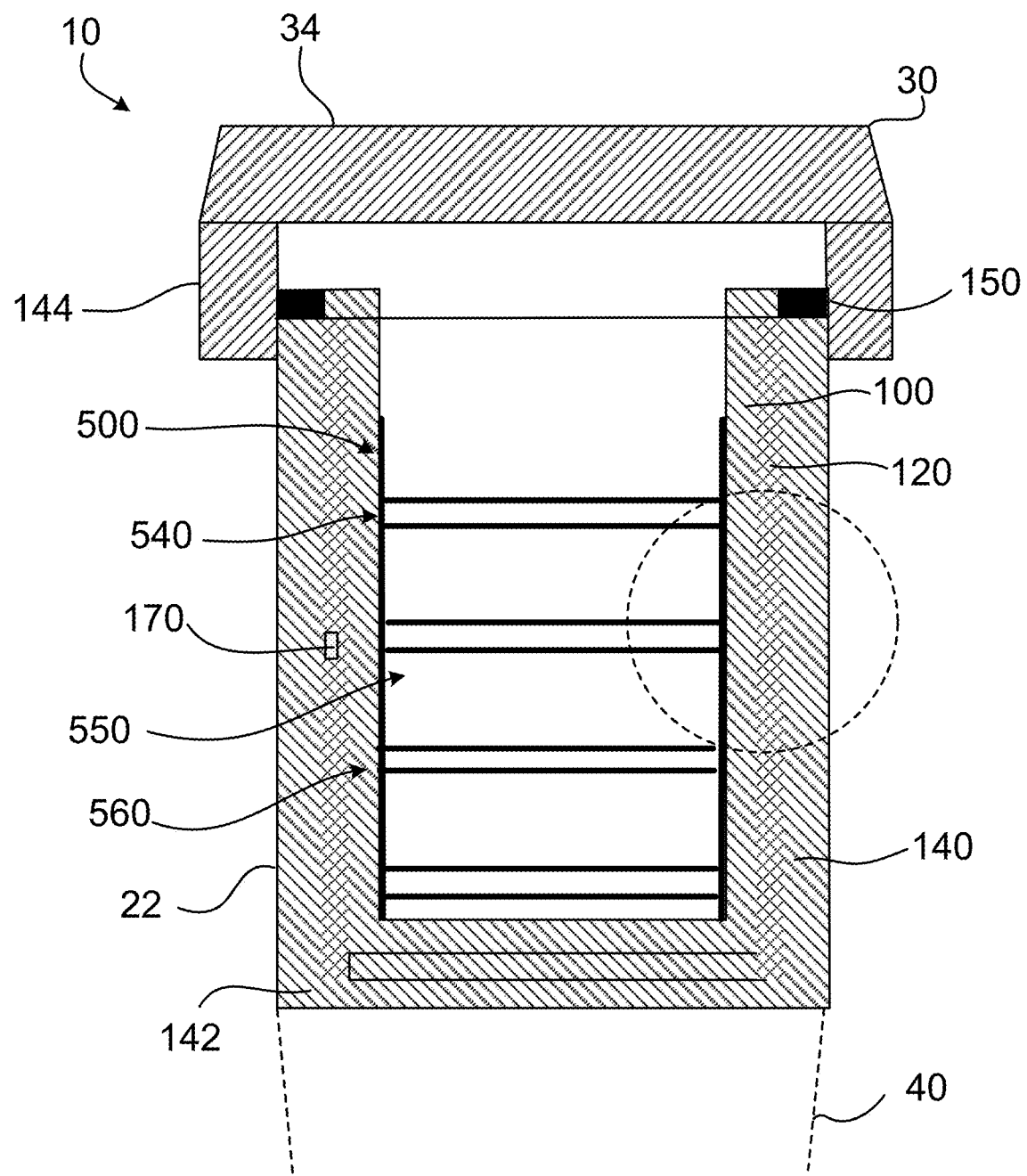
FIG. 9 is a cross section of an embodiment of the waterless decarboxylation device having an insert with multiple compartments.

As shown in FIG. 9, an insert 500 having multiple compartments 510 can be used with the product container 100. In some instances, the insert 500 includes multiple compartments 540, 550, 560. Multiple compartments can be used to heat separate ingredients at the same time without the ingredients touching each other. Further, in some examples, each compartment can be fully surrounded by the heating element.

Figure 10:
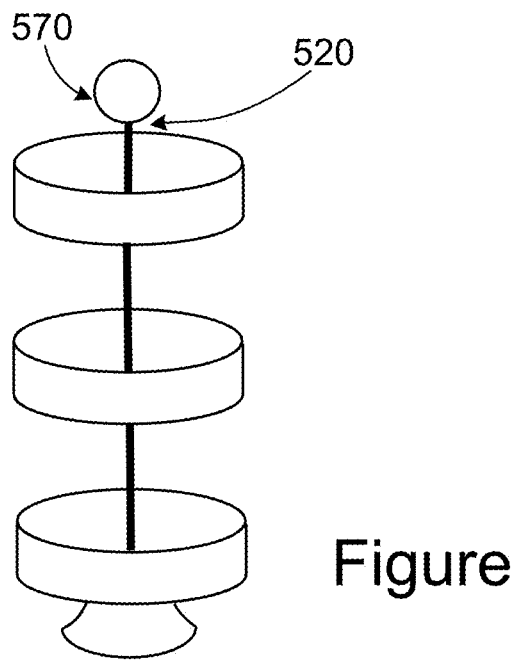
FIG. 10 is an example of an insert with multiple compartments with a tether.
Figure 11:
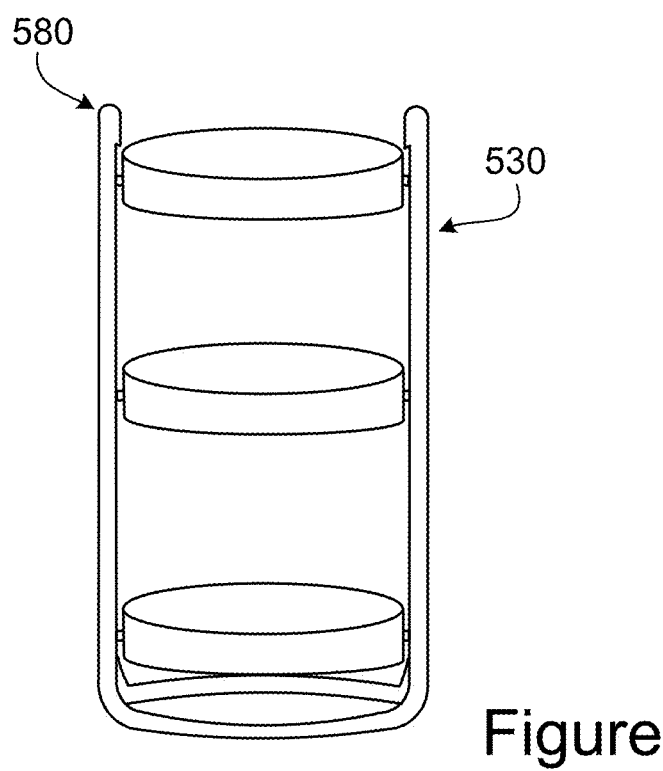
FIG. 11 is an example of an insert with multiple compartments contained within a sleeve.

The multiple compartments can be layered on top of one another. The layered compartments may be connected in a way that allows them to be removed without having to reach deep into the device. In some instances, the compartments sit on top of each other and are bound by a tether 520 (as shown in FIG. 10). In some instances, at least some of the compartments are partially or completely surrounded by (e.g., contained) within a sleeve 530 (as shown in FIG. 11). The tether 520 shown in FIG. 10 is located at the center position, but the tether could also be located elsewhere and/or take other forms. In other instances, the sleeve 530 may be swapped out for an empty internal container, for instance the product container 100. An upper part of the tether 570 and/or a top portion 580 (e.g., one or more handles) of the sleeve can be actuated (e.g., pulled) to remove the insert 500 from the device.

In some implementations, the compartments 540, 550, 560 are permanently affixed (e.g., fused, welded, or otherwise combined using any technique that resists detachment in use) to one another. In some implementations, the compartments 540, 550, 560 are separable and reconnectable to one another and may have various avenues for inserting and removing ingredients including stacking and sliding mechanisms, lids, doors, and other accessories. For instance, the compartments may be individualized drawers (e.g., each drawer is individually manipulated and/or opens and closes independent of the others). In other instances, the compartments are magnetically attached to one another, or attach to one another through a snap mechanism, or through any other suitable means, thereby allowing the removal of all compartments when one is pulled from the device. The compartments may sit horizontally or at an angle relative to one another.

In some examples, the compartments are solid walled containers, wired containers, solid walled shelves, and/or wired shelves. For example, the shelves are open on the top. The insert 500 may include different types of compartments. For instance, an insert may include both solid walled containers and wired shelving.

There can be as few as two and as many as ten or more compartments. The compartments can be further configured to hold a variety of smaller items or ingredients. For instance, a single compartment may be include compartmentalized sections each capable of holding respective different ingredients.

Figure 12:
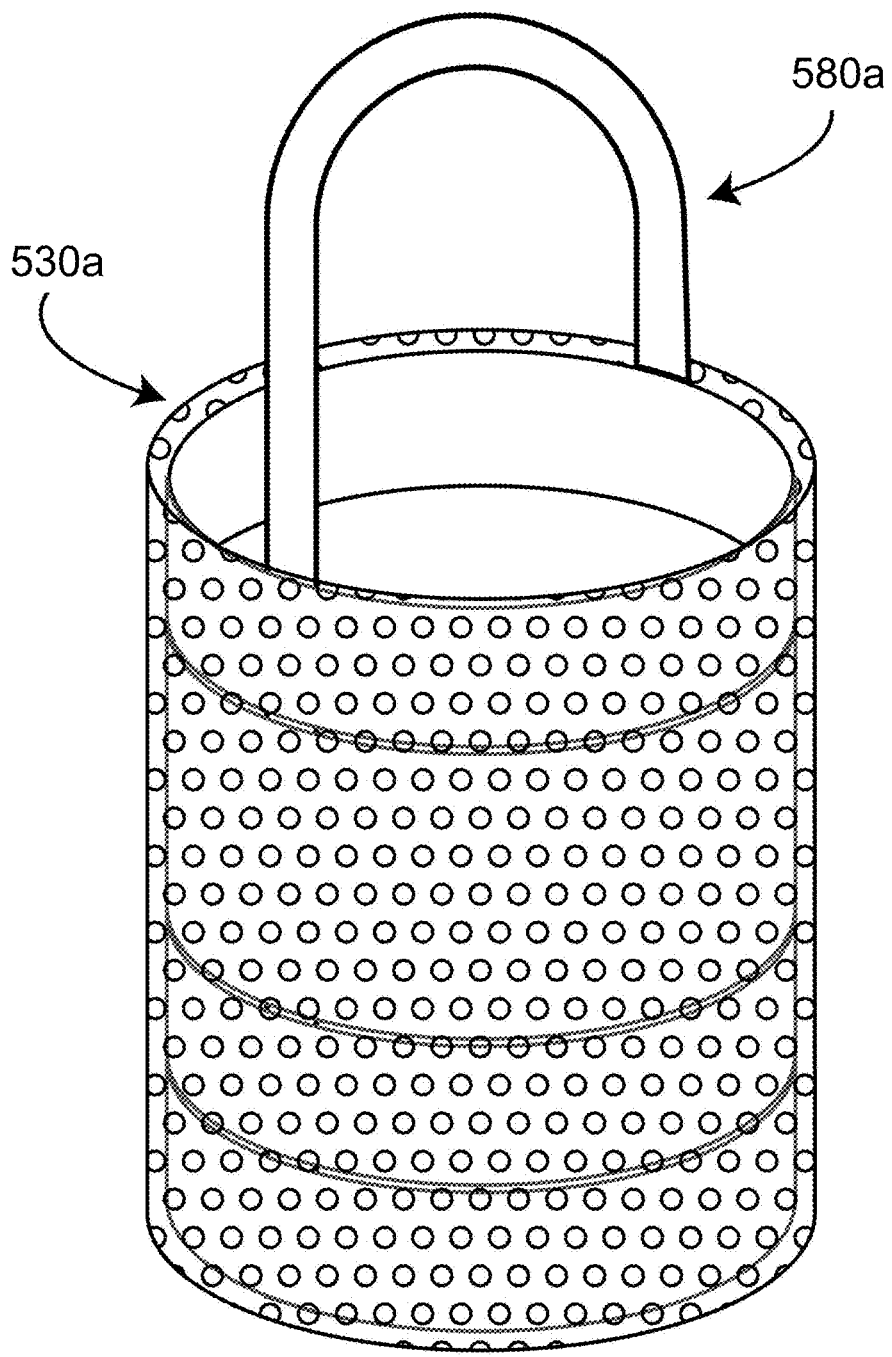
FIG. 12 is an example of an insert with multiple compartments contained within a perforated sleeve.

FIG. 12 shows another version of the sleeve 530a that has perforations, e.g., to enable additional circulation of air through the sleeve 530a. In some examples, the additional circulation of air enabled by the perforation of the sleeve 530a causes contents of the insert 500 to reach a target temperature more quickly and/or maintain a target temperature with fewer or less pronounced fluctuations in temperature. This version of the sleeve 530a also has a top portion 580a (e.g., one or more handles) that can be actuated (e.g., pulled) to remove the insert 500 from the device.

A number of embodiments of the invention have been described. Nevertheless, it will be understood that various modifications may be made without departing from the spirit and scope of the invention.

Although the figures and description above refer to a cylindrical or near-cylindrical lightweight waterless portable heating device 10, the lightweight waterless portable heating device can be other shapes. For example, the lightweight waterless portable heating device can be spherical.

Accordingly, other embodiments are within the scope of the following claims.

What is claimed is:

1. A waterless portable precision heating device for even heating, comprising:
   an ingredient container to contain one or more food-related, a health-related, or crafting-related ingredients;
   an insert sized to fit in the heating device and having multiple compartments, each compartment configured for holding one or more of the ingredients;
   a thin heating element configured to surround and contact the ingredient container;
   an insulation layer configured to surround and contact the heating element;
   an outer shell surrounding the insulation layer;
   a lid that encloses the ingredient container and fluidly seals it from the environment;
   at least one sensor configured to detect the temperature of the device; and
   a circuit board with a controller that controls the heating of the heating element in response to signals received from the at least one sensor indicating whether the ingredient container has reached a threshold temperature.

2. The device of claim 1, wherein the insert comprises at least two compartments.

3. The device of claim 1, wherein the multiple compartments are permanently connected to one another or are separable from one another.

4. The device of claim 1, wherein the multiple compartments are permanently connected to one another and each compartment of the multiple compartments is an individualized drawer.

5. The device of claim 1, wherein the multiple compartments are magnetically attached to one another.

6. The device of claim 1, wherein the multiple compartments attach to one another through a snap mechanism.

7. The device of claim 1, wherein each compartment of the multiple compartments sits horizontally or at an angle relative to another compartment of the multiple compartments.

8. The device of claim 1, wherein the multiple compartments are solid walled containers, wired containers, solid walled shelves, wired shelves, or a combination thereof.

9. The device of claim 1, wherein a single compartment of the multiple compartments is further configured to have compartmentalized sections.

10. The device of claim 1, wherein the controller is configured to control power to the heating element to maintain the ingredient container temperature at temperature greater than 100° C.

11. The device of claim 1, wherein the insert is sized to fit in the ingredient container.

12. The device of claim 1, wherein the ingredient container comprises the insert.

13. The device of claim 1, wherein the insert comprises a handle or a tether for removing the insert.

14. The device of claim 1, wherein the insert comprises a sleeve surrounding one or more of the compartments.

15. The device of claim 14, wherein the sleeve comprises perforations.

* * * * *